(12) United States Patent
Joong (10) Patent No.: US 7,520,619 B2
(45) Date of Patent: Apr. 21, 2009

(54) PROJECTION SYSTEM AND COOLING SYSTEM OF THE SAME

(75) Inventor: Kim Dong Joong, Gumi-si (KR)

(73) Assignee: LG Electronics Inc., Seoul (KR)

( * ) Notice: Subject to any disclaimer, the term of this patent is extended or adjusted under 35 U.S.C. 154(b) by 453 days.

(21) Appl. No.: 11/302,232

(22) Filed: Dec. 14, 2005

(65) Prior Publication Data
US 2007/0030458 A1 Feb. 8, 2007

(30) Foreign Application Priority Data
Aug. 5, 2005 (KR) .................. 10-2005-0071765

(51) Int. Cl.
  *G03B 21/18* (2006.01)
  *H04N 5/74* (2006.01)
(52) U.S. Cl. .............................. 353/58; 353/57; 348/748
(58) Field of Classification Search ............ 348/E5.143, 348/744, 748, 836; 353/58, 57, 60–61, 119
See application file for complete search history.

(56) References Cited

U.S. PATENT DOCUMENTS 7,384,156 B2 * 6/2008 Suzuki ........................ 353/61

2003/0189694 A1* 10/2003 Yamada et al. .................. 353/77
2004/0218356 A1* 11/2004 Seki et al. .................... 361/690
2005/0094105 A1* 5/2005 Otsuka et al. .................. 353/52
2006/0097675 A1* 5/2006 Hsu ........................... 318/280

FOREIGN PATENT DOCUMENTS

EP 1124156 A1 * 8/2001
EP 1 124 156 B1 10/2005

OTHER PUBLICATIONS

European Search Report dated Dec. 14, 2006.*

* cited by examiner

*Primary Examiner*—Hung Henry Nguyen
(74) *Attorney, Agent, or Firm*—Ked & Associates, LLP (57) ABSTRACT

There is provided a cooling system of a projection system including: a division plate dividing an inside space of the projection system into a light projecting space and an optical engine housing space; a first fan sucking air of the light projecting space into the optical engine housing space; a composition unit passing air before sucking the air to the first fan; and a second fan discharging air discharged from at least first fan to the outside. Therefore, the cooling of the projection system is smoothly performed and injection of foreign substance and deterioration of image quality are prevented.

18 Claims, 7 Drawing Sheets

PROJECTION SYSTEM AND COOLING SYSTEM OF THE SAME

This Nonprovisional application claims priority under 35 U.S.C. § 119(a) on Patent Application No. 10-2005-0071765, filed in Korea on 5 Aug. 2005 the entire contents of which are hereby incorporated by reference.

BACKGROUND OF THE INVENTION

1. Field of the Invention

The present invention relates to a projection system, and more particularly, to a projection system and a cooling system thereof which smoothly cools a reflecting-type projection system forming an image with an LCOS panel. Still more particularly, it relates to a projection system and a cooling system thereof which smoothly cools an optical engine generating high heat in the projection system.

2. Description of the Background Art

Unlike a general liquid crystal display, a liquid crystal on silicon (hereinafter, referred to as "LCOS") that is a kind of a reflecting-type liquid crystal display forms a liquid crystal cell on a semiconductor substrate and can realize a large screen having a high definition of a XGA grade or more in a small size of about one inch by arranging switching circuits and elements of each pixel in high integration.

For these reasons, the LCOS panel has been attracted as a display device of the projection system and technical development and commercialization of the LCOS panel and a projection display system using the LCOS panel have been actively progressed.

In order to embody a full color screen, the projection system uses a three panel type which converts white color light to RGB three color light, has three LCOS panels corresponding to the R, G, B light to compose R, G, B images embodied by each LCOS panel in a color image, and projects the composed image to a screen.

Such general LCOS projection system includes an illumination unit for projecting light, a composition unit for composing RGB three images displayed in the LCOS panel in an image after projecting light, a projecting lens for projecting light composed in the composition unit, and a screen for displaying light projected from the projecting lens to an image.

Specifically, all of the illumination unit, the composition unit, and the projecting lens are called as an optical engine and the optical engine is highly heated by an illuminating light of the lamp. Accordingly, a suitable cooling system should be provided to cool such high heat. However, when outside air is injected to cool, it is important to allow foreign substance with cooling air not to be injected. If high heat is not cooled, many films provided in the illumination unit and the LCOS panel provided in the composition unit are may be oxidized and thus the projection system may be not normally operated.

SUMMARY OF THE INVENTION

Accordingly, an object of the present invention is to solve at least the problems and disadvantages of the background art.

An object of the present invention is to provide a projection system and a cooling system thereof which can rapidly cool high heat generated in the projection system to stably operate the system.

Another object of the present invention is to provide a projection system and a cooling system thereof, which do not deteriorate an image quality although the projection system is used for long time by allowing foreign substance not to be injected into an optical engine during cooling the system.

Still another object of the present invention is to provide a projection system and a cooling system thereof, which can stably perform an operation of the projection system although the system is used for long time.

To achieve these and other advantages and in accordance with the purpose of the present invention, as embodied and broadly described, there is provided a cooling system of a projection system comprising: a division plate dividing an inside space of the projection system into a light projecting space and an optical engine housing space; a first fan sucking air of the light projecting space into the optical engine housing space; a composition unit through which air passes before sucked into the first fan; and a second fan discharging air ejected from at least the first fan to the outside.

According to another aspect of the present invention, there is provide a projection system comprising: a lamp generating light; an illumination unit increasing an efficiency of light emitted from the lamp; a composition unit composing an image with light which is incident through the illumination unit; a projecting lens projecting an image composed in the composition unit; a screen displaying an image projected from the projecting lens; a first fan sucking inner air of a light projecting space that is the backside of the screen after passing through the composition unit; and a second fan discharging air to the outside of the system.

According to a further aspect of the present invention, there is provided a cooling system of a projection system comprising: a first cooling system sucking air of a light projection space to a first fan via a composition unit; and a second cooling system sucking inner air of an optical engine to a second fan via a lamp.

As described above, according to the present invention, there is an advantage in that the projection system can be stably operated in high definition and specifically, because cooling of the system can be smoothly performed, reliability of the system operation is improved.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Hereinafter, a projection system and an LCOS panel assembly thereof according to the present invention will be described in detail with reference to the attached drawings.

Figure 1:
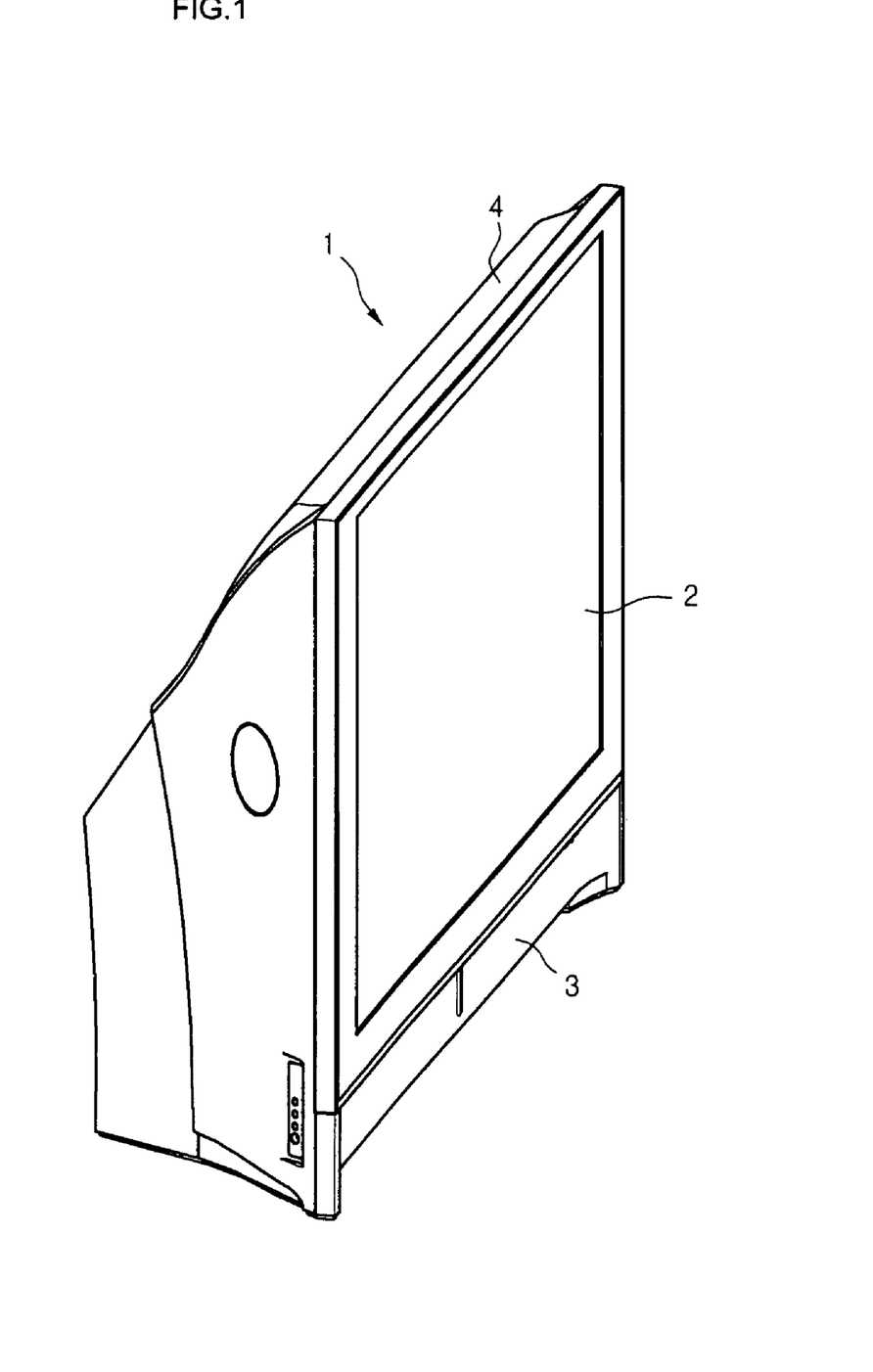
FIG. 1 is a perspective view of a projection system according to the present invention.
Figure 2:
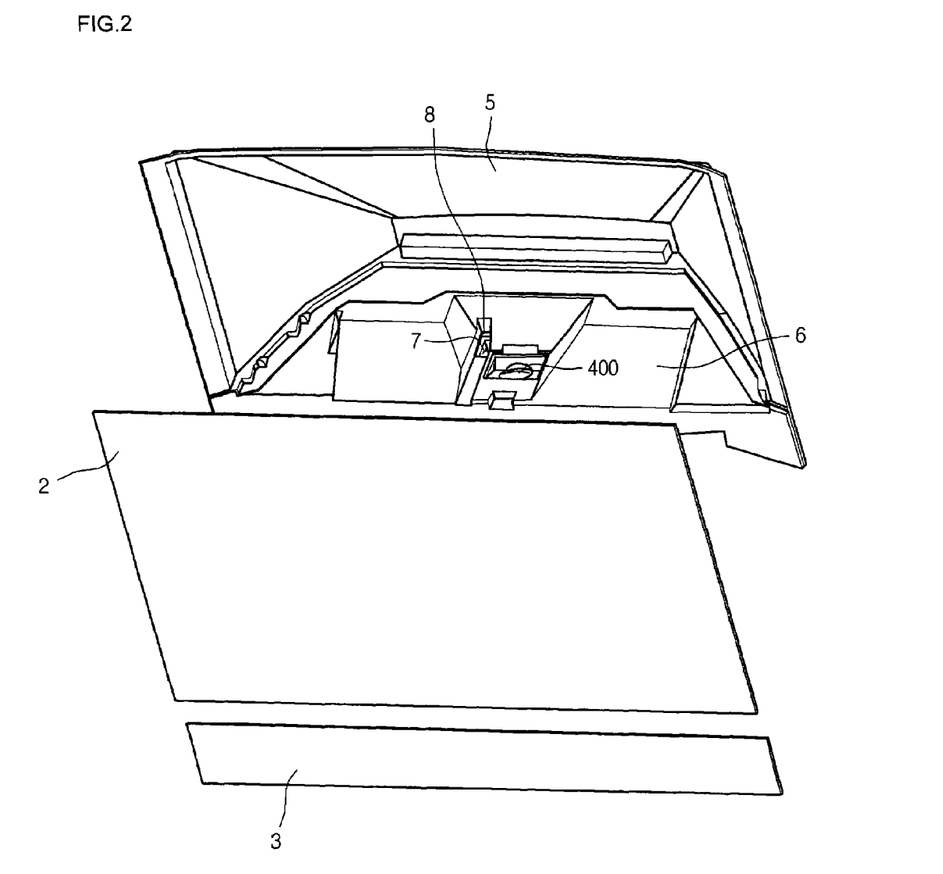
FIG. 2 is an exploded perspective view of a display in the projection system according to the present invention.

FIG. 1 is a perspective view of a projection system according to the present invention and FIG. 2 is an exploded perspective view of a display in the projection system according to the present invention.

Referring to FIGS. 1 and 2, a projection system 1 according to the present invention includes a screen 2 for displaying an image, a front panel 3 disposed at the lower side of the screen 2, and a back cover 4 disposed at the back side of the screen 2.

Further, a division plate 6 for dividing a light projecting space and an optical engine (see reference numeral 10 of FIG. 3) housing space is provided in a space between the screen 2 and the back cover 4. A reflecting mirror 5 is provided at the inside of the back cover 4 to reflect light which is projected from the optical engine 10 to the screen 2 and thus the reflected light is displayed to the screen 2 as an image.

Further, a opening portion 8 of the division plate side which communicates the light projecting space and the optical engine housing space is formed in the division plate 6 and the opening portion 8 is aligned with an air injection port 7 that is an air injection passage of the optical engine 10 side to inject inner air of the light projecting space into the optical engine 10. Air injected through the air injection port 7 is used as air for cooling the optical engine 10.

Reference numeral 400 shown in FIG. 2 indicates a projecting lens for emitting light from the optical engine 10 and light emitted from the projecting lens 400 is emitted to the reflecting mirror 5, reflected at the reflecting mirror 5, and forms an image at the screen 2.

Figure 3:
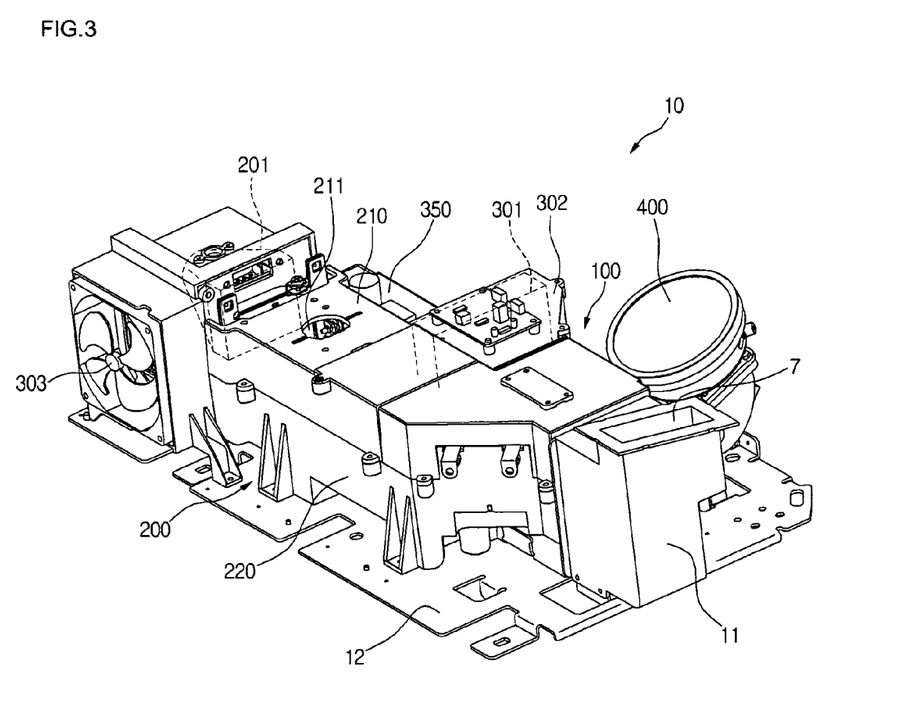
FIG. 3 is a perspective view of an optical engine in the projection system according to the present invention.
Figure 4:
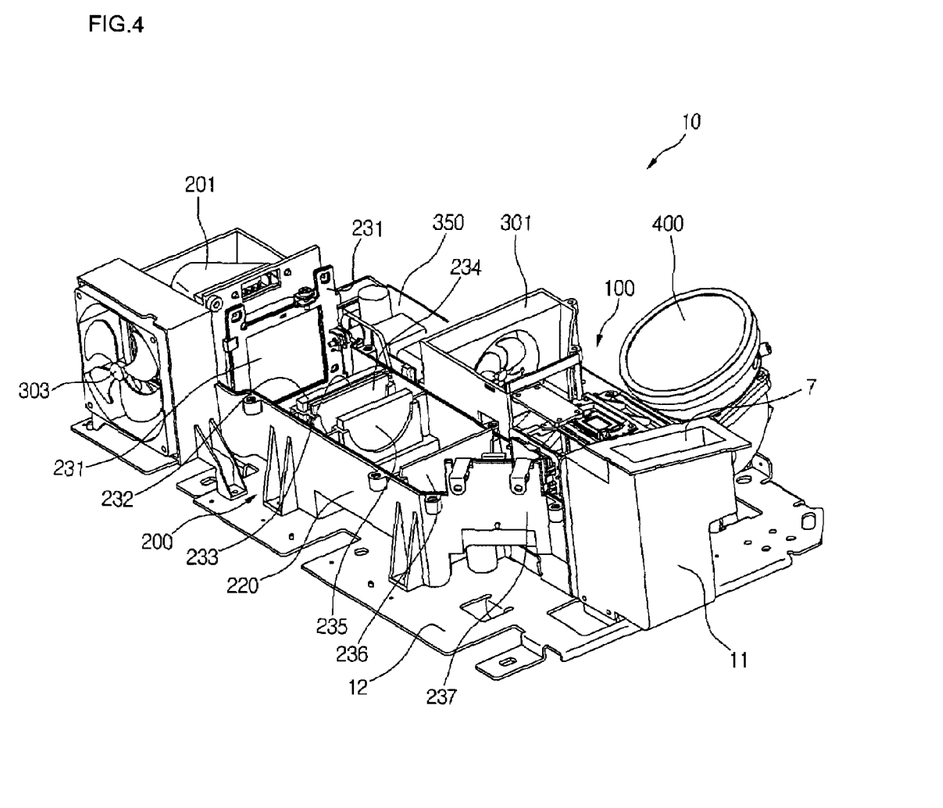
FIG. 4 is a perspective view of the optical engine whose a cover is removed.

FIG. 3 is a perspective view of an optical engine in the projection system according to the present invention and FIG. 4 is a perspective view of the optical engine whose a cover is removed. Referring to FIGS. 3 and 4, a construction and a function of the optical engine will be described in detail.

The optical engine 10 includes an engine base 12 forming a lower surface of the optical engine 10 and a lot of parts placed on an upper surface of the engine base 12. A lot of parts include an illumination unit 200 for irradiating and refracting light, a composition unit 100 composing an image of RGB three color light including an image signal by light from the illumination unit 200, and a projecting lens 400 for projecting light composed at the composition unit 100.

Further, a lot of parts further include a power supplier 350 for stably supplying power and fans 301 and 303 for cooling heat generated at the optical engine 10. At least an electronic stabilizer is provided in the power supplier 350 to supply stable power to a lamp 201 and the fans 301 and 303 flow air for properly cooling the optical engine 10.

Now, the aforementioned structural elements will be described in detail.

First, the illumination unit 200 includes the lamp 201 for operating as a light source, a first fly eye lens (FEL) 231 and a second FEL 232 for improving uniformity of illuminating light emitted from the lamp 201, a polarizing beam splitter (PBS) 233 disposed at the backside of the second FEL 232, a plurality of lens 234, 235, and 236 for exactly projecting light passed through each cell of the FELs 231 and 232 at a right position of the LCOS panel, and a folding mirror 237 for turning a traveling direction of a light source to the composition unit 100.

Specifically, the PBS 233 converts all light including P-polarized light in the illuminating light into S-polarized light, uses a plurality of half-wave plates, and the FELs 231 and 232 allows light to be incident at a right position of the PBS 233. The illuminating light includes S-polarized light that has X axis wavelength and P-polarized light that has Y axis wavelength which have a direction perpendicular to the light traveling direction and P-polarized light emitted to the composition unit is converted to S-polarized light by the PBS 233 and thus all light is incident to the composition unit 100 in S-polarized state. Therefore, there is an advantage in that a utilization efficiency of light is improved because the P-polarized light which may be removed is used.

Specifically, the folding mirror 237 turns by 90° a traveling direction of the illuminating light to allow light to be incident to the composition unit 100 and it is preferable that a predetermined device for adjusting a tilt angle of a right-left/a top-bottom/a front-rear direction is provided to exactly adjust a traveling direction.

Further, parts of the illumination unit 200 are provided to a housing 220 of the illumination unit which is fixed to the engine base 12, after parts are placed at the inside of the housing 220 of the illumination unit, a cover 210 is covered to protect the inside parts from external impact and prevent foreign substance from being injected into the inside of the illumination unit 200. A penetrating opening 211 is formed in a predetermined position of the cover 210 and discharges heat generating in parts constituting the illumination unit 200 and an inner space of the illumination unit 200 to the outside by natural convention. Although one penetrating opening 211 is formed in the figure, a plurality of penetrating openings may be formed as needed. Preferably, the penetrating opening 211 is formed at the upper side around the PBS 233 to discharge high heat generating at the PBS 233 to the outside by natural convention.

After S-polarized light is incident to the composition unit 100, it is separated by wavelengths and incident into each LCOS panel, and it is composed at a state including an image signal after it is reflected in the LCOS panel and emitted through the projecting lens 400. A detailed construction of the composition unit 100 will be described later.

Each construction to be applied to the projection system, specifically, a cooling system of the optical engine 10 according to the present invention will be briefly described.

First, two fans 301 and 303 for forcedly flowing air and a plurality of guide structures for guiding air flow by the fans 301 and 303 are provided in the optical engine 10. According to the flow order of air, the cooling system of the optical engine will be described.

First, cold air injected into a space between the screen 2 and the back cover 4, that is, a light projecting space through the air injection port 7 is injected into the optical engine 10 side, specifically into the side of the composition unit 100. Air injected into the composition unit 100 is injected into the first fan 301 after cooling inside heat of the composition unit 100. Air ejected from the first fan 301 is ejected to the power supplier 350 to cool heat generated from the power supplier 350.

Further, in order to cool the lamp 201, the second fan 303 is provided in the side of the lamp 201. The second fan 303 discharges air (including air ejected from the first fan 301) around the power supplier 350 to the rear of the projection system 1 after injecting to the lamp 201 side, thereby discharging to the outside of the projection system.

As can be seen from the aforementioned structure, the first fan 301 and the second fan 303 are provided around a heat source to provide sucking force and thus cold air is discharged by the fans 301 and 303 after absorbing heat while it passes a heat source.

Figure 5:
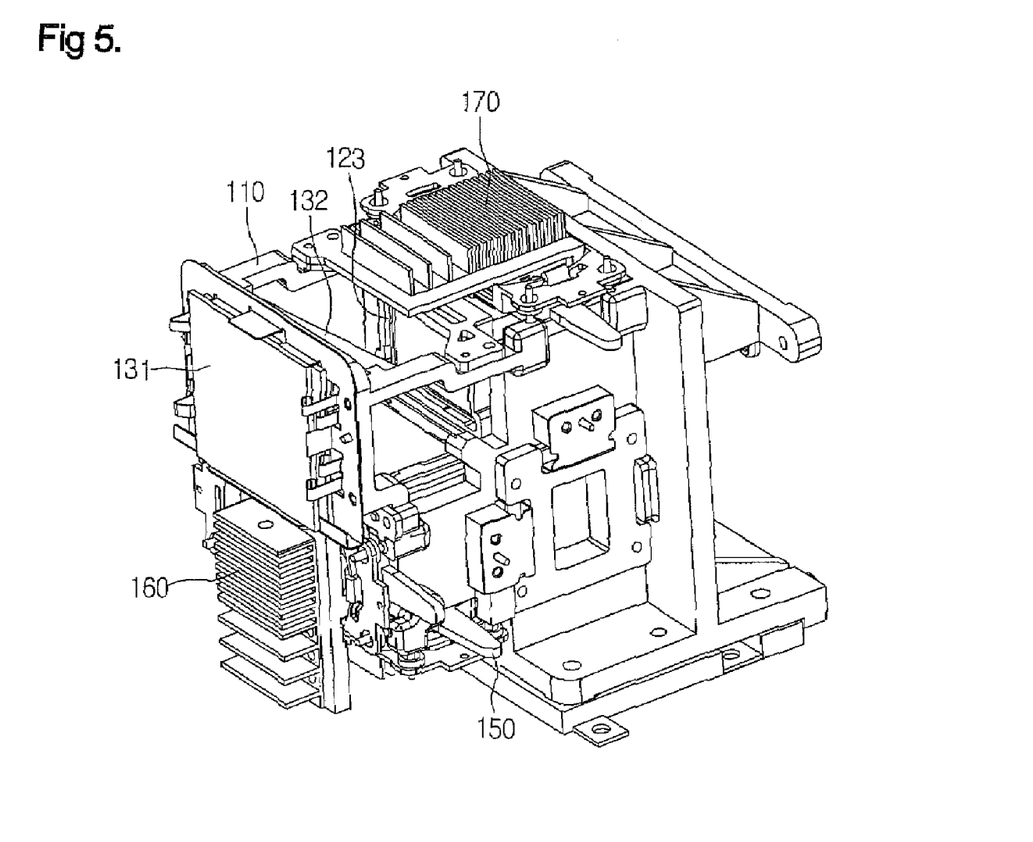
FIG. 5 is a perspective view of a composition unit in the projection system according to the present invention.
Figure 6:
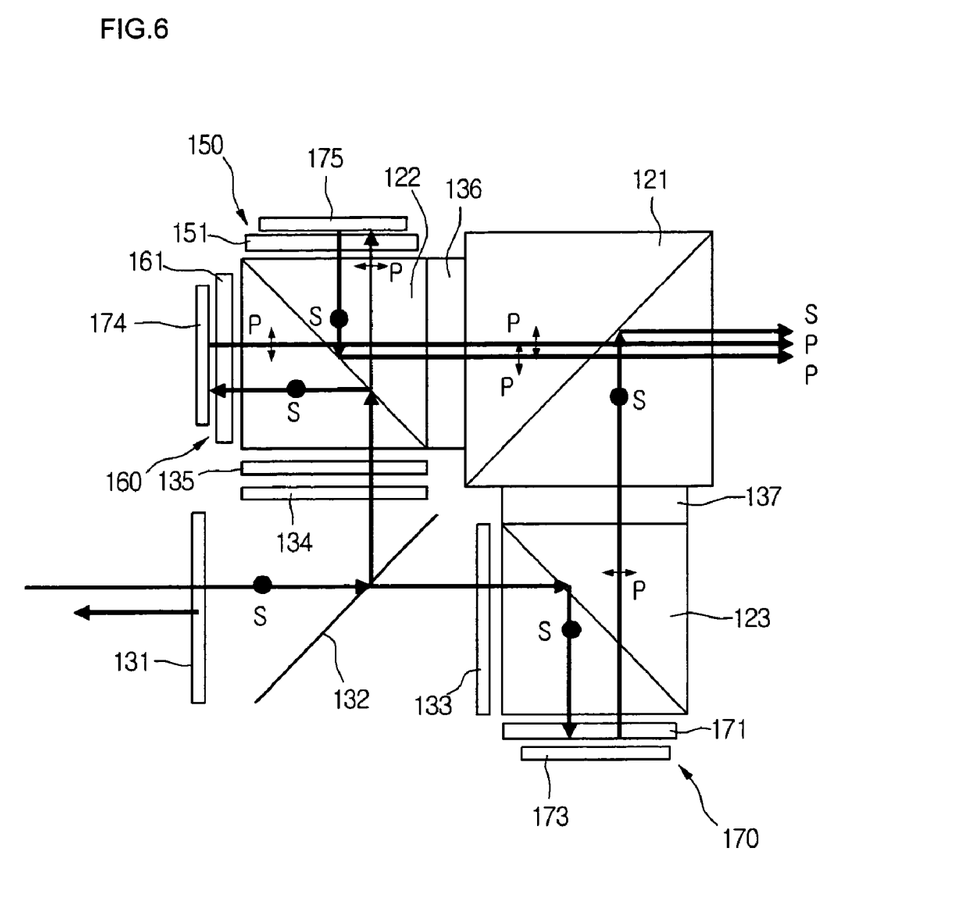
FIG. 6 is a view illustrating a structure and an operation of the composition unit.

FIG. 5 is a perspective view of the composition unit in the projection system according to the present invention and FIG. 6 is a view illustrating a structure and an operation of the composition unit. A structure and an operation of the composition unit 100 will be described in detail with reference to the drawings.

Referring to FIG. 5, the composition unit 100 forms an image by separating and composing S-polarized light and is provided with a plurality of quads and a LCOS panel assembly.

Specifically, the composition unit 100 includes three quads 121, 122, and 123, a quad housing 110 for supporting the quads, a single notch filter 131 for removing yellow light which is not required for S-polarized light, a dichroic mirror 132 for transmitting blue color light and reflecting green color light and red color light, and three LCOS panel assemblies 150, 160, and 170 fixed to the side of the quads 121, 122, and 123 to form the respective images of RGB three colors. The LCOS panel assemblies are provided to be adjacent to planes of the quads 121, 122, and 123 at a predetermined position of the quad housing 110 to allow light incident from the quad to be incident to an exact position of the LCOS panel.

A lot of filters, polarizing plate, etc., which are not shown in the FIG. 5, are further included in the composition unit 100. An operation of the composition unit will be described with reference to FIG. 6.

Referring to FIG. 6, after unnecessary yellow light is reflected and removed in the S-polarized light incident to the single notch filter 131, the remaining light is incident to the dichroic mirror 132, and in the light, blue color light is transmitted and red color light and green color light are reflected. Now, a traveling process of light will be described in the order of blue color light, red color light, and green color light.

S-polarized blue color light which is transmitted the dichroic mirror 132 firstly passes through a second reflective polarizing plate 133 to increase the purity of S-polarized light. In other words, the purity of S-polarized light in illuminating light is improved because the second reflective polarizing plate 133 passes through only light having the same direction as optical axis of the S-polarized blue color light and filters light having a different direction of optical axis.

Next, the light is reflected in the third quad 123 and incident to the third LCOS panel assembly 170. The quad as a beam splitter reflects S-polarized light and transmits P-polarized light.

Next, after the light is incident to a third quarter-wave plate 171 and linear polarized light is converted to circular polarized light, it is incident to a blue color LCOS panel 173, converted to P-polarized blue color light at a state including an blue color image and reflected. Although the P-polarized blue color light is again incident to the third quad 123, it is just transmitted to the third quad 123 because it is P-polarized blue color light.

Next, after the light is incident to a third birefringence polarizing plate 137, polarized by a half wavelength, and converted to S-polarized blue color light, it is incident to the first quad 121. The birefringence polarizing plate is to sort light generating polarized light and can perform the function with a structure which differently disposes a birefringence material depending on wavelength of light. The third birefringence polarizing plate 137 polarizes by a half wavelength with respect to blue color light.

Next, because S-polarized blue color light which is incident to the first quad 121 is S-polarized light, it is reflected in the first quad 121 and incident to the projecting lens 400.

Further, after S-polarized red color light which is reflected in the dichroic mirror 132 passes through the first reflective polarizing plate 134 and improves the purity of S-polarized light, it passes through the first birefringence polarizing plate 135 and is converted to P-polarized red color light. The first birefringence polarizing plate 135 polarizes red color light by a half wavelength using a birefringence material.

Next, the light is incident to the second quad 122 and because the incident light is P-polarized red color light, it is incident to the first LCOS panel assembly 150 after just transmitting the second quad 122.

Next, because the light is incident to a red color LCOS panel 175 after converting to circular polarized light by a first quarter-wave plate 151, it is converted to S-polarized red color light at a state including an red image and reflected, and reflected in the second quad 122 because it is S-polarized red color light.

Next, because the light is incident to the second birefringence polarizing plate 136, it is polarized by a half wavelength and converted to P-polarized red color light, and it is incident to the first quad 121 at the converted state. Because P-polarized red color light which is incident to the first quad 121 is P-polarized light, it is incident to the projecting lens 400 by transmitting the first quad 121.

Further, after S-polarized green color light which is reflected in the dichroic mirror 132 passes through the first reflective polarizing plate 134 and improves the purity of S-polarized light, it just transmits the first birefringence polarizing plate 135. Because the first birefringence polarizing plate 135 uses a birefringence material and polarizes only red color light by a half wavelength, it does not polarize green color light.

Next, because the light is incident to the second quad 122 and the incident light is S-polarized green color light, it is incident to the second LCOS panel assembly 160 after it is reflected in the second quad 122.

Next, because the light is incident to a green color LCOS panel 174 after converting to circular polarized light by a second quarter-wave plate 161, it is converted to P-polarized red color light at a state including a green color image and reflected, and just transmits the second quad 122 because it is P-polarized red color light.

Next, the P-polarized red color light just transmits the second birefringence polarizing plate 136 and is incident to the first quad 121 without polarizing. The second birefringence polarizing plate 136 converts only red color light and blue color light by a half wavelength and does not polarize green color light. Because P-polarized red color light which is incident to the first quad 121 is P-polarized light, it is incident to the projecting lens 400 by transmitting the first quad 121.

As described above, red color light and green color light are incident to the projecting lens at a P-polarized light state and blue color light is incident to the projecting lens 400 at an S-polarized light state. Then, after emitting from the projecting lens 400, three color light is reflected in the reflecting mirror 5 and displays an image to the screen 2. At this time, because a viewer watches an image at a state where it can not be sensed whether light of an image is S-polarized light or P-polarized light, there is no problem in watching an image.

After three color light including RGB three color images is composed, it is emitted through the projecting lens 400. If three color light is not matched at an exact position, an image is distorted or exact color is not embodied. Therefore, a matching process of all LCOS panels is further performed.

On the other hand, high heat is generated by light generated from in the lamp 201 in a lot of components provided in the optical engine 10 and such high heat should rapidly discharge to the outside for a normal operation of the apparatus. If high heat generated during an operation of the apparatus is not discharged to the outside, there is a problem in that an image may not match by expanding of parts and the LCOS panel and various films may be oxidized.

For this reason, according to the present invention, the cooling is performed by air sucked into the fan. Now, the cooling system of the projection system for solving these problems will be described in detail.

Figure 7:
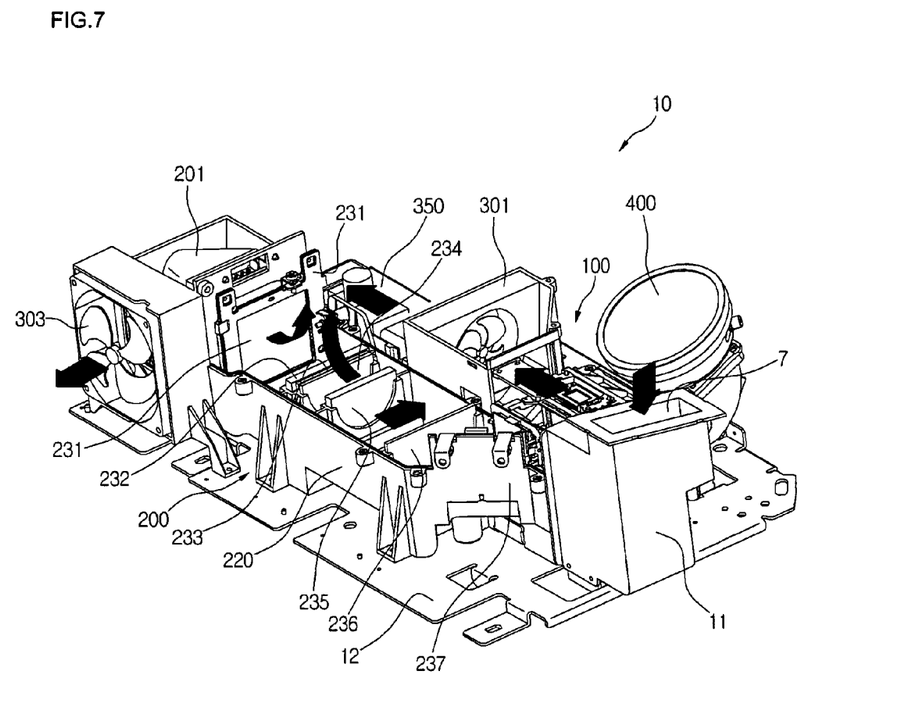
FIG. 7 is a perspective view illustrating a cooling process of the optical engine according to the present invention.

FIG. 7 is a perspective view illustrating a cooling process of the optical engine according to the present invention. A construction and a function of the cooling system of the projection system according to the present invention will be described in detail with reference to FIG. 7.

The cooling system of the present invention is divided into three parts of a first cooling system for mainly cooling the composition unit 100, a second cooling system for cooling the lamp 201 directly generating high heat, and a third cooling system for cooling related parts such as lens placed at the inside of the illumination unit using natural convection.

First, the first cooling system is operated by the first fan 301 and cold air injected into a space between the screen 2 and the back cover 4, that is, a light projecting space through the air injection port 7 is injected into the composition unit 100. The air injection port 7 is opened to the upper side of a cold air injection guide 11 fixed to the side wall of the composition unit 100 and aligned with an opening portion (see 8 of FIG. 2) of the division plate side. The inside of the air injection guide 11 is bended to inject into the side of the composition unit 100 after injecting air from the upper side through the air injection port 7. Air injected to the composition unit 100 is sucked into the first fan 301 after cooling inside heat of the composition unit 100.

Further, a suction guide (see 302 of FIG. 3) as a power source for smoothly discharging air injected to the inside of the composition unit 100 is provided in the neighboring outside of the first fan 301 to provide a negative pressure to the inside of the composition unit 100. Air ejected from the first fan 301 is ejected to the power supplier 350 to cool heat generated in the power supplier 350 by convection. Further, because the first fan 301 is provided at the inside of a bended corner portion of the illumination unit 200 and the composition unit 100, it is possible to efficiently use an inside space of the projection system.

As can be seen from the aforementioned structure, because the cooling system using the first fan 301 transmits a negative pressure provided in the first fan 301 to the composition unit 100 and the cool air injection guide 11, air of the light projecting space is sucked through the opening portion 8 of the division plate side.

Further, a negative pressure generated in the first fan 301 is transmitted to the inside of the housing 220 of the illumination unit and the composition unit 100. Accordingly, high heat generated at the inside of the illumination unit 200 is injected into the first fan 301 side and discharged. For this reason, it is preferable that a predetermined size of hole (not shown) is formed in a predetermined position of the side wall of the housing 220 of the illumination unit.

The second cooling system according to the present invention is operated by the second fan 303 placed at the side of the lamp 201 and after injecting air (including air ejected from the first fan 301) around the power supplier 350 to the lamp 201 side and absorbing high heat of the lamp 201, the second fan 303 discharges air to the rear side of the projection system 1, that is, the outside of the apparatus.

As can be seen from the aforementioned structure, the first and second cooling systems are positioned around a heat source and provide suction force, so that cold air which passes through the heat source and absorbs heat is sucked to fans 301 and 303 and discharged. When air sucked by such a suction-type cooling system is injected into high heat parts, for example, the composition unit 100, it can be stably injected in a flowing manner of laminar flow, so that a cooling efficiency of high heat parts is increased. Further, because foreign substance does not float due to air flow of laminar flow injected into high heat parts, it is possible to prevent an optical unit from being contaminated due to foreign substance.

The third cooling system according to the present invention uses by the penetrating opening 211 formed in the cover 210. Because high temperature air at the inside of the illumination unit 200 is discharged to the outside after risen by convection phenomenon through the penetrating opening 211, the third cooling system can be operated without an additional driving source such as a fan. Because the inside of the illumination unit 200 is not so large high temperature atmospheres, there is no problem in cooling, although a cooling system using natural convection is applied. Because foreign substance does not float, the density of foreign substance is decreased in inner air of the optical engine 10, so that it is possible to solve a problem that the LCOS panel, etc. is contaminated.

According to the cooling system of the present invention, it is possible to decrease contamination of the projection system, specifically the optical engine and to improve a cooling efficiency.

According to the present invention, because high heat generated in the projection system is rapidly cooled, the projection system can be stably operated.

Further, because the density of foreign substance is decreased at a space where the optical engine is placed during the cooling of the projection system, the decline of image quality is prevented although the projection system is used for long time.

Further, because heat load to a lots of parts is decreased by rapid cooling, it possible to solve a problem of the projection system such as the decline of image quality, etc.

Further, because heat emitting parts, specifically the composition unit is cooled by laminar flow of air sucked into the fan, it is possible to reduce a problem that foreign substance may be injected into heat emitting parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cooling system of a projection system, comprising:
a division plate that divides an inside space of the projection system into a light projecting space and an optical engine housing space;
a first fan that draws air from the light projecting space into the optical engine housing space;
a composition unit through which air passes before passing through the first fan;
a second fan that receives air from at least the first fan and discharges the received air to the outside; and
a cold air injection guide that connects the light projecting space and the composition unit, wherein the cold air injection unit turns a flow direction of incoming air such that the flow direction is horizontal between the first fan and the second fan.

2. The cooling system of claim 1, wherein an ejection side of the first fan faces a power supplier.

3. The cooling system of claim 1, further comprising a lamp through which air passes before passing through the second fan.

4. The cooling system of claim 1, wherein the first fan and the second fan which are uprightly positioned so as to cause air to flow through the optical engine housing space in a horizontal direction.

5. The cooling system of claim 1, wherein at least some portion of air drawn in by the first fan passes through an illumination unit.

6. The cooling system of claim 1, wherein air passes horizontally through the composition unit.

7. The cooling system of claim 1, wherein air flow passing the composition unit is a laminar flow.

8. A projection systems comprising:
- a lamp that generates light; an illumination unit that increases an efficiency of light emitted by the lamp;
- a composition unit that composes an image from light which is incident through the illumination unit;
- a projecting lens that projects an image composed by the composition unit;
- a screen that displays an image projected by the projecting lens;
- a first fan that draws air from a light projecting space that is at a backside of the screen after passing through the composition unit; and
- a second fan that receives air from the first fan and discharges the received air to an outside of the apparatus; and
- a cold air injection guide that connects the light projecting space and the composition unit, wherein the cold air injection unit turns a flow direction of incoming air such that the flow direction is horizontal between the first fan and the second fan.

9. The projection system of claim 8, wherein the illumination unit is cooled by natural convention.

10. The projection system of claim 8, wherein air ejected from the first fan cools a power supplier.

11. The projection system of claim 8, wherein the first fan is disposed at an inside a corner formed between the illumination unit and the composition unit.

12. The projection system of claim 8, further comprising a suction guide which houses the first fan at an inside thereof, wherein at least some portion of the suction guide is opened to the composition unit.

13. The projection system of claim 8, further comprising a cover which covers the illumination unit, wherein the cover includes an opening that discharges aft from the illumination unit.

14. A cooling system of a projection system comprising:
- a first cooling system that draws air from a light projection space through a first fan via a composition unit; and
- a second cooling system that draws air from an interior of an optical engine through a second fan via a lamp, wherein the first cooling system comprises a cold air injection guide that guides air from the light projection space to the composition unit, and wherein the cold aft injection guide is bent so as to receive air at its upper end in a vertical direction and to inject air into a side of the composition unit and discharge air from the first fan in a horizontal direction.

15. The cooling system of claim 14, wherein the first cooling system draws air from at least an illumination unit.

16. The cooling system of claim 14, further comprising a third cooling system that penetrates a cover covering an upper side of the illumination unit, wherein the third cooling system discharges high temperature air from an inside of the illumination unit.

17. The cooling system of claim 14, wherein air flow passing through the composition unit is a laminar flow.

18. The cooling system of claim 14, wherein air ejected from the second fan is discharged to the outside of the projection system.

* * * * *